United States Patent [19]
Ruane

[11] Patent Number: 5,004,164
[45] Date of Patent: Apr. 2, 1991

[54] SALT TRUCK

[76] Inventor: George W. Ruane, 5660 Delhi Rd., Cincinnati, Ohio 45238

[21] Appl. No.: 383,917

[22] Filed: Jul. 21, 1989

[51] Int. Cl.$^5$ .............................................. A01C 17/00
[52] U.S. Cl. ...................................... 239/666; 239/104
[58] Field of Search ............... 239/104, 657, 665, 666, 239/687

[56] References Cited

U.S. PATENT DOCUMENTS

| | | | |
|---|---|---|---|
| 1,508,210 | 9/1924 | Bangert | 239/657 |
| 2,003,628 | 6/1935 | Chadwick | 239/657 |
| 2,179,483 | 11/1939 | Currivan et al. | 239/657 |
| 2,281,212 | 4/1942 | Stoltzfus | 239/104 |
| 2,956,810 | 10/1960 | Voich et al. | 239/666 |
| 2,988,368 | 6/1961 | Kerr | 239/666 |
| 3,038,665 | 6/1962 | Doerr | 239/104 |
| 3,583,645 | 6/1971 | Murray et al. | 239/666 |
| 3,790,090 | 2/1974 | Lorenc et al. | 239/666 |

FOREIGN PATENT DOCUMENTS

| | | | |
|---|---|---|---|
| 29346 | 3/1958 | Finland | 239/665 |
| 1010191 | 6/1952 | France | 239/665 |

Primary Examiner—Andres Kashnikow
Assistant Examiner—Michael J. Forman
Attorney, Agent, or Firm—Roy F. Schaeperklaus

[57] ABSTRACT

A salt truck including a salt distributing spinner device mounted on a bed of the truck and receiving salt from a bin carried on the bed. A guide support mounted on the bed supports a staff with an end portion of the staff etending from the guide support opposite the salt distributing device. A flexible panel attached to the end portion of the staff extends downwardly from the staff into the path of salt projected sidewise of the direction of truck advance to catch and stop travel of the salt sidewise of the direction of truck advance.

5 Claims, 2 Drawing Sheets

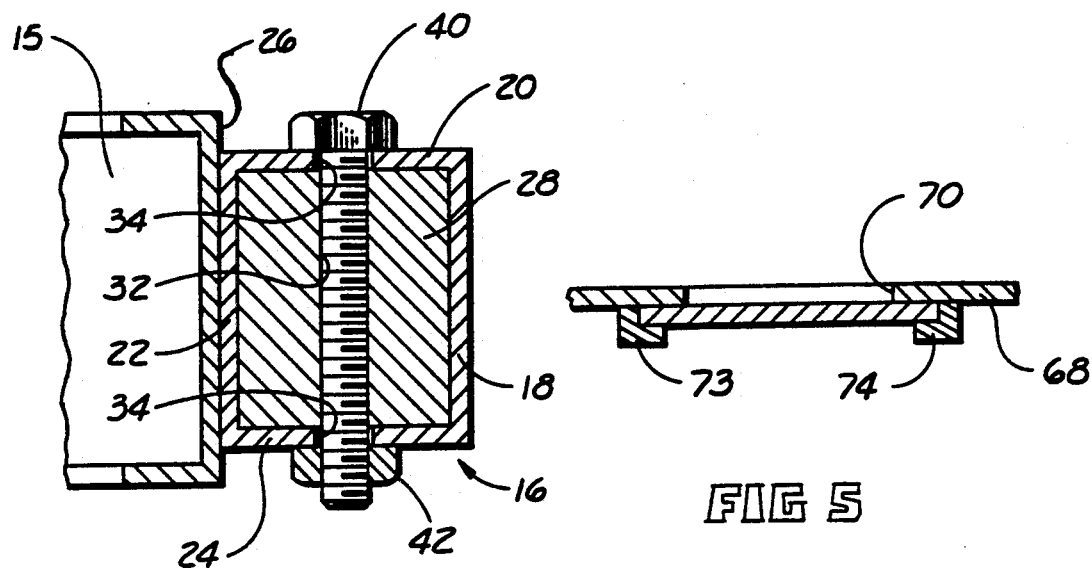
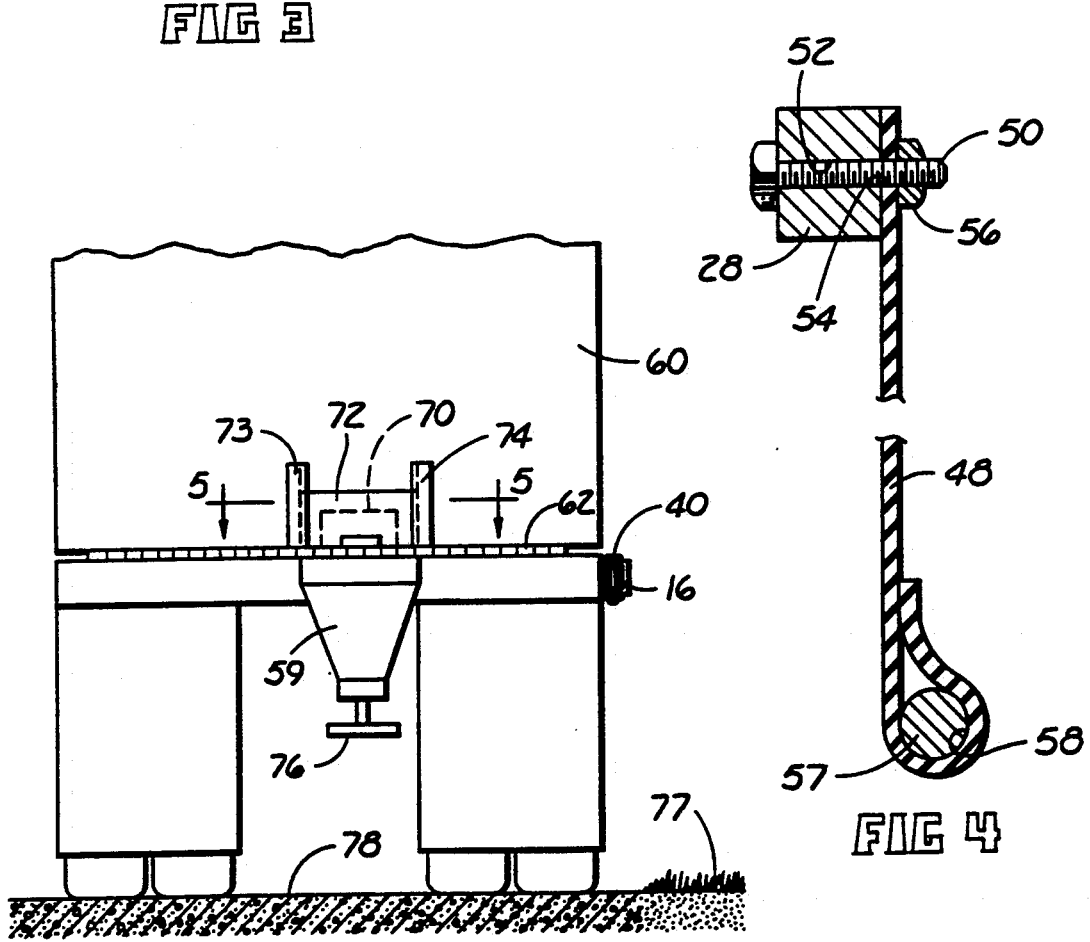

SALT TRUCK

BACKGROUND OF THE INVENTION

This invention relates to a highway truck for spreading salt or the like on a road. More particularly, this invention relates to a device for a salt spreading truck which guides the salt away from grass areas or the like along the road.

Salt as it is commonly spread is directed outwardly in all directions from a spreader device. The salt which is directed sideways of a salt spreading truck can reach a grass plot or other vegetation along the road and can kill the grass or vegetation and hinder regrowth of other vegetation in the salt affected area, which on occasion may extend on the order of ten (10) feet from the road, until precipitation leaches the salt concentration down to suitably reduced levels tolerated by vegetation. An object of this invention is to provide a device for a salt spreading truck which intercepts sideways directed salt so that the salt does not reach an adjacent grass plot or the like.

BRIEF DESCRIPTION OF THE INVENTION

Briefly, this invention provides a flexible panel which is suspended from a staff. The staff is mounted on a side frame of a salt dispensing truck with the staff substantially horizontal and with the panel extending downwardly of the staff into alignment with a salt spreader carried by the truck so that salt directed sidewise of the truck toward an edge of a road on which the truck travels is deflected to fall on the road before it can reach a grass plot or other vegetation along the side of the road.

The above and other objects of the invention will be apparent to those skilled in the art to which this invention pertains from the following detailed description and the drawings in which:

BRIEF DESCRIPTION OF THE DRAWINGS

FIG. 2 is a view in rear elevation of the truck with a guide support of the salt guide assembly mounted on a frame of the truck, a salt guide member being removed;

FIG. 3 is a view in section taken on the line 3—3 in FIG. 1;

FIG. 4 is a view in section taken on the line 4—4 in FIG. 1; and

FIG. 5 is a view in section taken on the line 5—5 in FIG. 2.

DESCRIPTION OF THE PRESENTLY PREFERRED EMBODIMENT OF THE INVENTION

Figure 1:
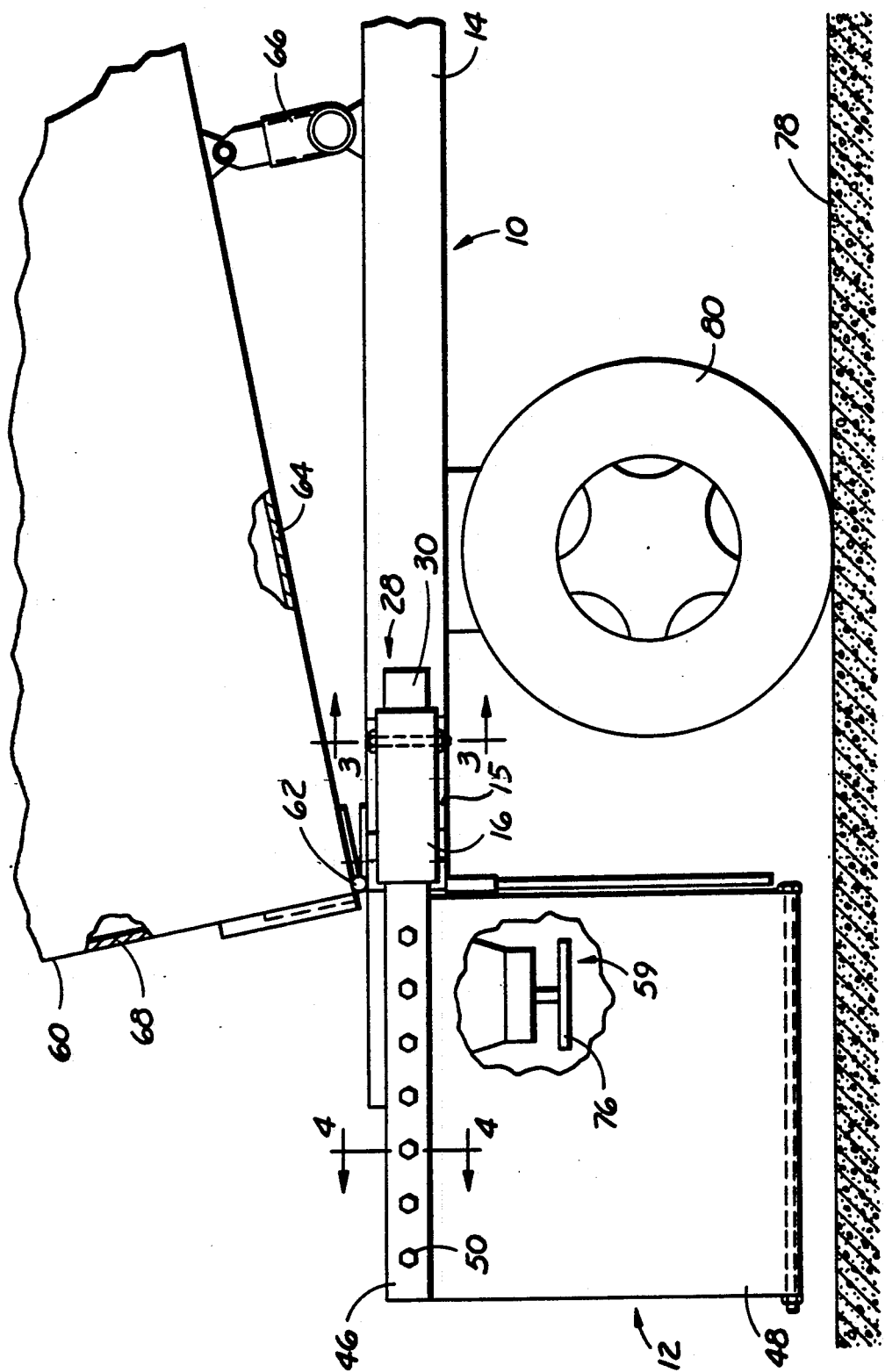
FIG. 1 is a fragmentary view in side elevation showing a salt dispensing truck equipped with a salt spreader and a salt guide assembly constructed in accordance with an embodiment of this invention.

In the following detailed description and the drawing, like reference characters indicate like parts.

In FIG. 1 is shown a rear portion 10 of a truck on which is mounted a salt guide assembly 12 constructed in accordance with an embodiment of this invention. The truck includes an elongated frame member 14 on which a guide support 18 is mounted. As shown in FIG. 3, the guide support 16 is a tubular member having flat sides 18, 20, 22 and 24, one of which is attached to an upright face 26 of a bracket 15 mounted on the frame member 14 with the axis of the guide support 16 being substantially horizontal. A staff 28 of rectangular cross section is slideably mounted in the guide support. An end portion 30 of the staff may project forwardly from the guide support 16. The opening 32 in the staff 28 can be brought into alignment with openings 34 in the guide support 16. A bolt 40 can be mounted in the openings 32 and 34 and is locked in position by a nut 42. An opposed end portion 46 of the staff 28 carries a guide member 48, which is attached to the staff 28 by fasteners 50. The fasteners 50 extend through transverse openings 52 and 54 in the staff 28 and the guide member 48, respectively. Nuts 56 threaded on the fasteners 50 hold an upper edge portion of the guide member 48 and the staff 28 in assembled relation. The guide member 48 is formed of flexible material such as sheet rubber or the like. A weight rod 57 is mounted in a pocket 58 in a lower edge portion of the guide member 48.

A salt dispensing device 59 is mounted on the rear portion 10 of the truck. A salt holding truck body 60 is pivotally mounted on the rear portion of the truck at a hinge 62. A lower side 64 of the body 60 slopes toward the salt distributing device 59. The angle of slope of the lower side 64 can be varied by means of a jacking arrangement 66 (not shown in detail). A rear wall 68 of the body 60 is provided with an opening 70 through which salt can be discharged from the body 60 to the salt distributing device 59. A door 72 for the opening 70 can slide on tracks 73 and 74 between closed and open positions (not shown in detail). A spinning plate member 76 of the salt dispensing device 59 propels the salt outwardly from the device 59. The salt guide member 48 extends downwardly from the staff 28 at the side line of the truck into the path of salt being distributed by the spinning plate member 76 to limit sidewise discharge of salt substantially beyond the side line of the truck to prevent salt from being propelled out onto a grass plot 77 or the like along an edge of a road 78 on which wheels 80 of the truck run.

The salt guide described above and illustrated in the drawings is subject to structural modification without departing from the spirit and scope of the appended claims.

Having described my invention, what I claim as new and wish to secure by letters patent is:

1. The combination of a truck including a bed, a salt bin mounted on the bed, there being a discharge opening in the bin, and a salt distributing spinner device mounted on the bed and receiving salt from the discharge opening, the spinner device distributing salt circumferentially of the spinner device with a guide support mounted on the bed, the guide support having an elongated opening having an axis extending lengthwise of the direction of advance of the truck, a staff mounted in the opening in the guide support and extending longitudinally in the direction of the axis of the opening with an end portion of the staff extending cantileverwise from the guide support in opposed relation to the salt distributing device, and a guide member having a flexible rubberlike panel attached to the end portion of the staff and extending downwardly from the staff into the path of salt projected sidewise of the direction of truck advance to catch and stop travel beyond the side line of the truck of the salt sidewise of the direction of truck advance.

2. A combination as in claim 1 which includes means mounted on the staff and releasably mounted in the bed for holding the staff and the flexible panel in position.

3. The combination of a truck including a frame, a salt bin mounted on the frame, there being a discharge opening in the bin and a salt distributing spinner device mounted on the frame and receiving salt from the discharge opening, the spinner device distributing salt circumferentially of the spinner device with a guide support mounted on the frame adjacent a side line of the truck, the guide support having an elongated opening having an axis extending lengthwise of the direction of advance of the truck, a staff mounted in the opening in the guide support and extending longitudinally in the direction of the axis of the opening with an end portion of the staff extending cantileverwise from the guide support in opposed relation to the salt distributing device, and a guide member having a flexible rubberlike panel attached to the end portion of the staff and extending downwardly from the staff into the path of salt projected sidewise of the direction of truck advance to catch and stop travel beyond the side line of the truck of the salt sidewise of the direction of truck advance.

4. A combination as in claim 3 which includes flexible panel gravity tensioning means urging the panel to remain in the path of salt projected sidewise of the direction of truck advance while permitting the panel to flex in disengaging from obstructions.

5. A combination as in claim 3 which includes means mounted on the staff and releasably mounted on the frame for holding the staff and the flexible panel in position.

* * * * *